United States Patent
Ofuji et al.

(10) Patent No.: US 8,897,284 B2
(45) Date of Patent: Nov. 25, 2014

(54) RADIO BASE STATION

(75) Inventors: Yoshiaki Ofuji, Yokosuka (JP); Naoto Okubo, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 307 days.

(21) Appl. No.: 13/141,374

(22) PCT Filed: Dec. 15, 2009

(86) PCT No.: PCT/JP2009/070873
§ 371 (c)(1),
(2), (4) Date: Aug. 24, 2011

(87) PCT Pub. No.: WO2010/073936
PCT Pub. Date: Jul. 1, 2010

(65) Prior Publication Data
US 2011/0299466 A1 Dec. 8, 2011

(30) Foreign Application Priority Data
Dec. 22, 2008 (JP) ................. P2008-325628

(51) Int. Cl.
*H04J 1/00* (2006.01)
*H04J 3/16* (2006.01)
*H04B 7/04* (2006.01)
*H04B 7/06* (2006.01)
*H04L 1/00* (2006.01)
*H04L 1/18* (2006.01)
*H04W 72/08* (2009.01)

(52) U.S. Cl.
CPC ............ *H04B 7/0417* (2013.01); *H04B 7/063* (2013.01); *H04L 1/0003* (2013.01); *H04L 1/0007* (2013.01); *H04L 1/0017* (2013.01); *H04L 1/0026* (2013.01); *H04L 1/1867* (2013.01); *H04W 72/085* (2013.01)
USPC .......................................... 370/343; 370/468

(58) Field of Classification Search
None
See application file for complete search history.

(56) References Cited

U.S. PATENT DOCUMENTS

2002/0037729 A1* 3/2002 Kitazawa et al. ............. 455/452
2003/0103450 A1* 6/2003 Chapman et al. ............. 370/229
(Continued)

FOREIGN PATENT DOCUMENTS

| JP | 2006-238314 A | 9/2006 |
| JP | 2007-325142 A | 12/2007 |

(Continued)

OTHER PUBLICATIONS

3GPP TS 36.213 V10.1.0, Mar. 2011, "3rd Generation Partnership Project; Technical Specification Group Radio Access Network; Evolved Universal Terrestrial Radio Access (E-UTRA); Physical layer procedures (Release 10)," 114 pages.

(Continued)

*Primary Examiner* — Gregory Sefcheck
*Assistant Examiner* — Joshua Smith
(74) *Attorney, Agent, or Firm* — Osha Liang LLP

(57) ABSTRACT

A radio base station (eNB) according to the present invention includes: an RI acquisition unit (11) configured to acquire, from a mobile station (UE), an "RI" indicating number of streams determined by the mobile station (UE); an adjustment unit (12) configured to adjust the "RI" acquired by the RI acquisition unit (11), by using an offset value "RI offset" unique to the mobile station (UE); and a stream-number determination unit (13) configured to determine the number of streams to be simultaneously transmitted to the mobile station (UE), based on the "RI" adjusted by the adjustment unit (12).

2 Claims, 4 Drawing Sheets

(56) References Cited

U.S. PATENT DOCUMENTS

| | | | |
|---|---|---|---|
| 2004/0057461 A1* | 3/2004 | Dawidowsky et al. | 370/468 |
| 2009/0247223 A1* | 10/2009 | Yu et al. | 455/557 |
| 2010/0138715 A1 | 6/2010 | Motoyoshi | |
| 2010/0195594 A1* | 8/2010 | Seo et al. | 370/329 |
| 2010/0304691 A1* | 12/2010 | Goransson et al. | 455/69 |

FOREIGN PATENT DOCUMENTS

| | | |
|---|---|---|
| JP | 2007-536858 A | 12/2007 |
| JP | 2008-519562 A | 6/2008 |
| JP | 2008-546314 A | 12/2008 |
| WO | 2005/109717 A1 | 11/2005 |
| WO | 2006/052448 A2 | 5/2006 |
| WO | 2006/130541 A2 | 12/2006 |
| WO | 2007/088579 A1 | 8/2007 |
| WO | 2008/030798 A2 | 3/2008 |

OTHER PUBLICATIONS

International Search Report issued in PCT/JP2009/070873, mailed on Mar. 16, 2010, with translation, 4 pages.

* cited by examiner

| CQI | TBS | MODULATION SCHEME |
|---|---|---|
| $CQI_1$ | $TBS_1$ | A |
| $CQI_2$ | $TBS_2$ | B |
| ⋮ | ⋮ | ⋮ |

RADIO BASE STATION

TECHNICAL FIELD

The present invention relates to a radio base station configured to perform the MIMO multiplexing transmission in which multiple streams are simultaneously transmitted using multiple antennas to a mobile station in a downlink data channel.

BACKGROUND ART

In a mobile communication system of the LTE (Long Term Evolution) scheme defined in the 3GPP, a radio base station eNB is configured to perform the MIMO (Multi Input Multi Output) multiplexing transmission in which multiple different streams (data sequences) are simultaneously transmitted using multiple antennas to a mobile station UE.

The MIMO multiplexing transmission is characterized in that once a correlation of a radio propagation path between each transmitting antenna and a mobile station UE (fading correlation) increases, a reception quality (reception error rate) deteriorates.

Further, the MIMO multiplexing transmission is characterized in that when the number of streams to be simultaneously transmitted to the mobile station UE is decreased, a transmission rate decreases in a downlink but the reception quality improves.

Therefore, in the mobile communication system of the LTE scheme, in consideration of the characteristics of the above-described MIMO multiplexing transmission, the radio base station eNB is configured to adopt "Rank Adaptation control" in which the number of streams to be simultaneously transmitted to the mobile station UE is controlled based on "RI (Rank Indicator)" indicating the "Rank" of a radio propagation path estimated by the mobile station UE.

In this case, the "Rank" is calculated by the mobile station UE based on a fading correlation and a measurement value of reception SIR (Signal-to-Interference Ratio), and denotes the number of streams by which it is estimated to achieve the maximum throughput.

SUMMARY OF THE INVENTION

Problems to be Solved by the Invention

However, the above-described Rank Adaptation control has a problem that a desired reception quality may not be achieved due to a measurement error of a radio propagation path state such as the fading correlation and the reception SIR in the mobile station UE.

Therefore, the present invention is intended to overcome the above-described problem. An object of the present invention is to provide a radio base station capable of improving a probability of achieving a desired reception quality in Rank Adaptation control.

Means for Solving the Problem

A first aspect of the present invention is summarized as a radio base station configured to perform a MIMO multiplexing transmission in which multiple different streams are simultaneously transmitted in a downlink data channel to a mobile station by using multiple transmitting antennas, the radio base station including: a rank indicator acquisition unit configured to acquire, from the mobile station, a rank indicator indicating number of streams determined by the mobile station; a rank indicator adjustment unit configured to adjust the rank indicator acquired by the rank indicator acquisition unit, by using an offset value unique to the mobile station; and a stream-number determination unit configured to determine the number of streams to be simultaneously transmitted to the mobile station, based on the rank indicator adjusted by the rank indicator adjustment unit.

Effect of the Invention

As explained above, according to the present invention, it is possible to provide a radio base station capable of improving a probability of achieving a desired reception quality in Rank Adaptation control.

BEST MODES FOR CARRYING OUT THE INVENTION (Configuration of Mobile Communication System According to First Embodiment of the Present Invention)

Figure 1:
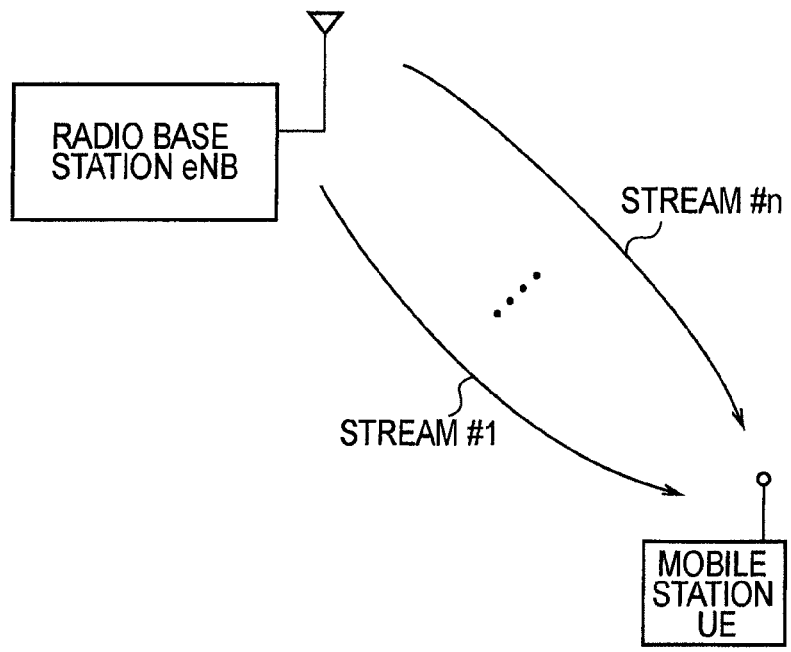
FIG. 1 is a diagram showing the entire configuration of a mobile communication system according to a first embodiment of the present invention.
Figure 2:
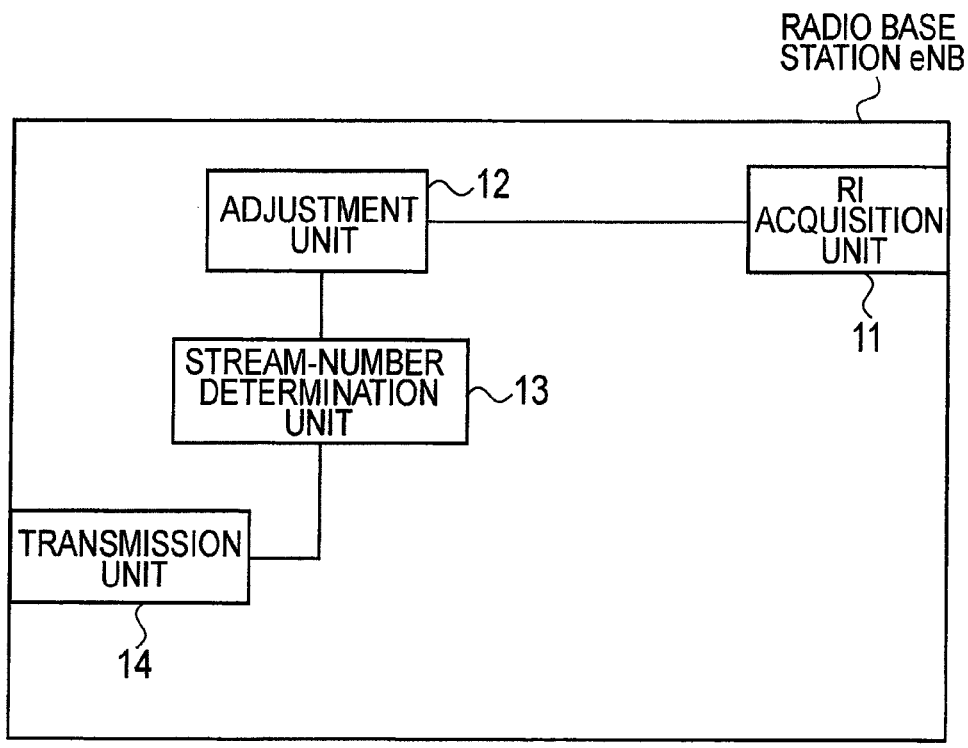
FIG. 2 is a functional block diagram of a radio base station according to the first embodiment of the present invention.

With reference to FIG. 1 and FIG. 2, the configuration of the mobile communication system according to the first embodiment of the present invention will be explained.

As illustrated in FIG. 1, the mobile communication system according to the embodiment is a mobile communication system to which the LTE scheme is applied, and includes a radio base station eNB and a mobile station UE.

In this case, the radio base station eNB is configured to perform the MIMO multiplexing transmission in which multiple different streams (data sequences) #1 to #n are simultaneously transmitted to the mobile station UE by using multiple transmitting antennas.

As illustrated in FIG. 2, the radio base station eNB includes an RI acquisition unit 11, an adjustment unit 12, a stream-number determination unit 13, and a transmission unit 14.

The RI acquisition unit 11 is configured to acquire, from the mobile station UE, an "RI (Rank Indicator)" indicating the number of streams determined by the mobile station UE, at a predetermined timing. For example, the RI acquisition unit 11 may regularly acquire the RI from the mobile station UE, or may acquire the RI from the mobile station UE when a predetermined trigger is generated.

The adjustment unit 12 is configured to adjust the "RI" acquired by the RI acquisition unit 11 by using an offset value "RI offset" unique to the mobile station UE.

That is, the adjustment unit 12 is configured to calculate an adjusted value of the RI "$RI_{Adjusted}$" by using the offset value "RI offset".

Specifically, the adjustment unit 12 is configured to calculate the adjusted value of the RI "$RI_{Adjusted}$" according to Equation (1).

$$RI_{Adjusted} = RI + RI\ \text{offset} \quad \text{(Equation 1)}$$

In this case, the adjustment unit 12 may be configured to adjust the offset value "RI offset", according to a reception result of the stream in the mobile station US.

Specifically, the adjustment unit 12 is configured to adjust the offset value "RI offset" according to Equation (2).

$$RI\ \text{offset} = \begin{cases} RI\ \text{offset} + \Delta(ACK) \\ RI\ \text{offset} - \Delta(NACK) \end{cases} \quad \text{[Equation 2]}$$

That is, the adjustment unit 12 may be configured to increase the offset value "RI offset" by "Δ" when receiving the stream is succeeded in the mobile station UE (when ACK is received from the mobile station UE), and to decrease the offset value "RI offset" by "Δ" when the receiving the stream is failed in the mobile station UE (when NACK is received from the mobile station UE).

In this case, an increase width "Δ" of the offset value "RI offset" may differ in value from a decrease width "Δ" of the offset value "RI offset".

The stream-number determination unit 13 is configured to determine the number of streams to be simultaneously transmitted to the mobile station UE, based on the RI adjusted by the adjustment unit 12, i.e., the "$RI_{Adjusted}$" calculated by the adjustment unit 12.

For example, the stream-number determination unit 13 is configured such that the number of streams indicated by the "$RI_{Adjusted}$" is the number of streams to be simultaneously transmitted to the mobile station UE.

The transmission unit 14 is configured to transmit the streams of which the number is determined by the stream-number determination unit 13, to the mobile station UE.

For example, the transmission unit 14 may be configured to transmit the streams via PDSCH (Physical Downlink Shared Channel, downlink data channel).

(Operation of the Mobile Communication System According to the First Embodiment of the Present Invention)

Figure 3:
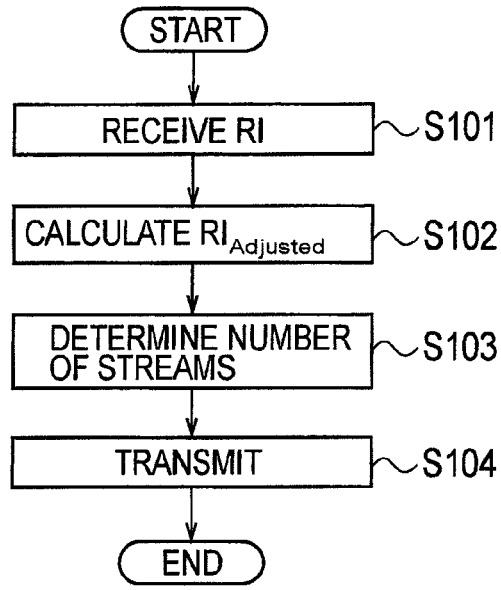
FIG. 3 is a flowchart illustrating an operation of the radio base station according to the first embodiment of the present invention.

With reference to FIG. 3, the operation of the radio base station eNB in the mobile communication system according to the first embodiment of the present invention will be explained.

As illustrated in FIG. 3, in step S101, the RI acquisition unit 11 acquires the RI from the mobile station UE at a predetermined timing.

In step S102, the adjustment unit 12 calculates the adjusted value of the RI "$RI_{Adjusted}$" by using the offset value "RI offset" unique to the mobile station UE. In this case, the offset value "RI offset" is updated according to the reception result of the stream by the mobile station UE.

In step S103, the stream-number determination unit 13 determines the number of streams to be simultaneously transmitted to the mobile station UE, based on the "$RI_{Adjusted}$" calculated by the adjustment unit 12.

In step S104, the transmission unit 14 transmits the streams of which the number is determined by the stream-number determination unit 13, to the mobile station UE.

(Operation and Effect of the Mobile Communication System According to the First Embodiment of the Present Invention)

According to the radio base station eNB used in the mobile communication system according to the first embodiment of the present invention, it is so configured that the RI acquired from the mobile station UE is adjusted by using the offset value "RI offset" in which the reception result of the streams in the mobile station UE is reflected, and therefore, it is possible to decrease a deterioration of the desired reception quality in the Rank Adaptation control resulting from a measurement error of a radio propagation path state in the mobile station UE.

(Configuration of Mobile Communication System According to Second Embodiment of the Present Invention)

Figure 4:
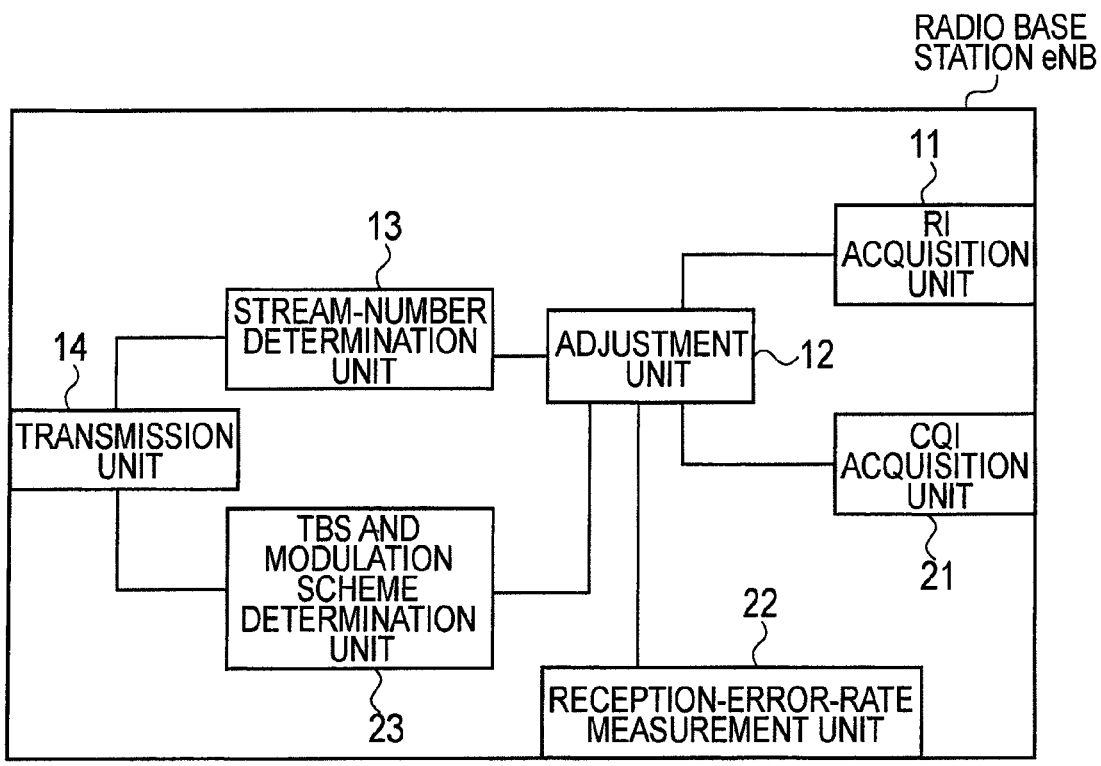
FIG. 4 is a functional block diagram of a radio base station according to a second embodiment of the present invention.
Figure 5:
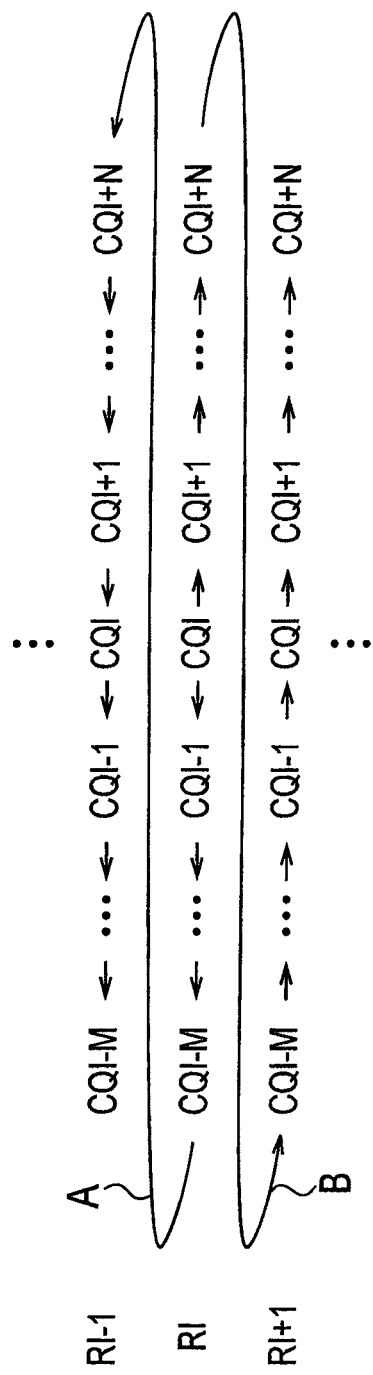
FIG. 5 is a flowchart illustrating an operation in which the radio base station according to the second embodiment of the present invention adjusts CQI.
Figures 6, 7:
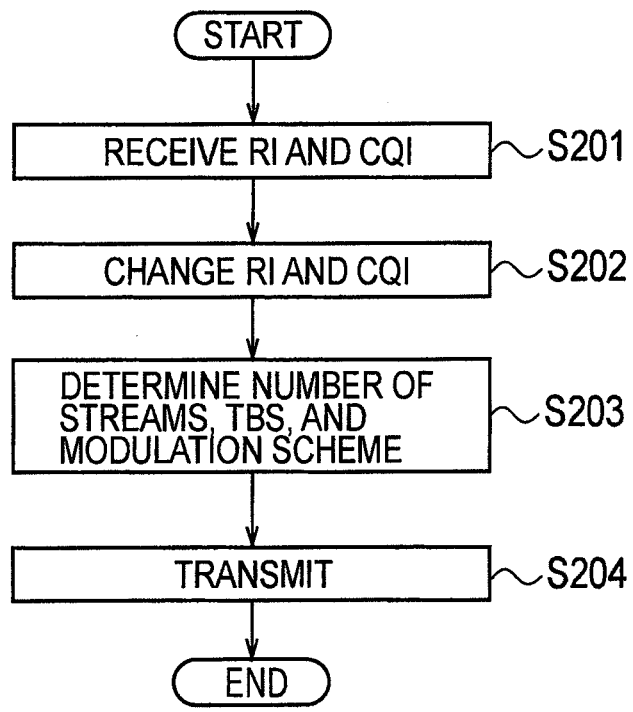
FIG. 6 is a table illustrating one example of a correspondence relationship among "CQI", "TBS", and a "modulation scheme" managed in the radio base station according to the second embodiment of the present invention.
FIG. 7 is a flowchart illustrating an operation of the radio base station according to the second embodiment of the present invention.

With reference to FIG. 4 to FIG. 6, the configuration of a mobile communication system according to a second embodiment of the present invention will be explained. Hereinafter, the configuration of the mobile communication system according to the present embodiment will be described while focusing the difference relative to the configuration of the mobile communication system according to the above-described first embodiment.

As illustrated in FIG. 4, in addition to the configuration of the radio base station eNB according to the above-described first embodiment, the radio base station eNB includes a CQI acquisition unit 21, a reception-error-rate measurement unit 22, and a TBS and modulation scheme determination unit 23.

The CQI acquisition unit 21 is configured to acquire channel quality information (e.g., CQI) in a downlink data channel (e.g., PDSCH) through which the streams are transmitted, from the mobile station UE.

The reception-error-rate measurement unit 22 is configured to measure a reception error rate (e.g., BLER) in the downlink data channel calculated based on an ACK/NACK signal for the downlink data channel notified by using an uplink channel for the mobile station UE.

In this case, examples of the uplink channels for the mobile station UE may include PUCCH (Physical Uplink Control Channel, uplink control channel), PUSCH (Physical Uplink Shared Channel, uplink data channel) and so on.

Here, the adjustment unit 12 is configured to adjust the RI acquired by the RI acquisition unit 11 and the CQI acquired by the CQI acquisition unit 21, according to the reception error rate in the downlink data channel for the mobile station UE.

That is, the adjustment unit 12 is configured to calculate the adjusted value of the RI "$RI_{Adjusted}$" and the adjusted value of the CQI "$CQI_{Adjusted}$", according to the reception error rate in the downlink data channel for the mobile station UE.

For example, as illustrated in FIG. 5, the adjustment unit 12 is configured to modify the RI and CQI in an arrow A direction when the reception error rate is larger than a predetermined threshold value, and to modify the RI and CQI in an arrow B direction when the reception error rate is smaller than the predetermined threshold value.

The TBS and modulation scheme determination unit 23 is configured to determine a transport block size (TBS) indicating the number of bits that can be transmitted by a modification scheme used and a predetermined radio resource (e.g., one resource block) used through a downlink data channel (e.g., PDSCH), based on the channel quality information adjusted by the adjustment unit 12, i.e., the adjusted value of the CQI "$CQI_{Adjusted}$".

In this case, the resource block is a minimum assignment unit of a radio resource for the PDSCH defined in a two-dimensional plane represented by a time direction and a frequency direction, and specifically, the resource block is configured by seven ODFM symbols and twelve sub-channels.

Specifically, as illustrated in FIG. 6, the TBS and modulation scheme determination unit 23 manages the "CQI", the "TBS", and the "modulation scheme" in a corresponding manner, and may be configured to set the "TBS" and the "modulation scheme" corresponding to the adjusted value of the CQI "$CQI_{Adjusted}$" adjusted by the adjustment unit 12, to the modulation scheme and TBS used in the downlink data channel.

(Operation of the Mobile Communication System According to the Second Embodiment of the Present Invention)

With reference to FIG. 7, the operation of the radio base station eNB in the mobile communication system according to the second embodiment of the present invention will be explained.

As illustrated in FIG. 7, in step S201, at a predetermined timing, the RI acquisition unit 11 acquires the RI from the mobile station UE, and the CQI acquisition unit 21 acquires the CQI from the mobile station UE.

In step S202, the adjustment unit 12 calculates the adjusted value of the RI "$RI_{Adjusted}$" and the adjusted value of the CQI "$CQI_{Adjusted}$" according to the reception error rate in the downlink data channel for the mobile station UE, as illustrated in FIG. 5.

In step S203, the stream-number determination unit 13 determines the number of streams to be simultaneously transmitted to the mobile station UE, based on the "$RI_{Adjusted}$" calculated by the adjustment unit 12, and the TBS and modulation scheme determination unit 23 determines the modulation scheme and the TBS used in the downlink data channel (e.g., PDSCH), based on the adjusted value of the CQI "$CQI_{Adjusted}$" calculated by the adjustment unit 12.

In step S204, the transmission unit 14 transmits the streams of which the number is determined by the stream-number determination unit 13, to the mobile station UE, via the downlink data channel to which the modulation scheme and the TBS determined by the TBS and modulation scheme determination unit 23 are applied.

(Operation and Effect of the Mobile Communication System According to the Second Embodiment of the Present Invention)

According to the radio base station eNB used in the mobile communication system according to the second embodiment of the present invention, it is so configured that the RI acquired from the mobile station UE is adjusted according to the reception error rate in the downlink data channel for the mobile station UE, and therefore, it is possible to decrease a deterioration of the desired reception quality in the Rank Adaptation control resulting from a measurement error of a radio propagation path state in the mobile station UE.

Further, according to the radio base station eNB used in the mobile communication system based on the second embodiment of the present invention, it is so configured that in addition to the RI acquired from the mobile station UE, the CQI is adjusted, according to the reception error rate in the uplink channel for the mobile station UE, and therefore, it is possible to select the appropriate modulation scheme and TBS by accommodating variations of the measurement accuracy of the CQI by the mobile station UE.

The above-mentioned characteristics of the embodiments may be expressed as follows:

A first aspect of the present embodiment is summarized as a radio base station eNB configured to perform the MIMO multiplexing transmission in which multiple different streams (data sequences) are simultaneously transmitted, by using multiple transmitting antennas, to a mobile station UE in a downlink data channel (e.g., PDSCH), including: an RI acquisition unit 11 configured to acquire, from the mobile station UE, an "RI (Rank Indicator)" indicating the number of streams determined by the mobile station UE; an adjustment unit 12 configured to adjust the "RI" acquired by the RI acquisition unit 11 (i.e., calculate an adjusted value of the RI "$RI_{Adjusted}$") by using an offset value "RI offset" unique to the mobile station UE; and a stream-number determination unit 13 configured to determine the number of streams to be simultaneously transmitted to the mobile station UE, based on the RI adjusted by the adjustment unit 12, i.e., the "$RT_{Adjusted}$" calculated by the adjustment unit 12.

In the first aspect of the present embodiment, the adjustment unit 12 may be configured to adjust the offset value "RI offset" unique to the mobile station UE according to a reception result of the streams in the mobile station UE.

In the first aspect of the present embodiment, the adjustment unit 12 may be configured to adjust the RI (i.e., calculate the "$RI_{Adjusted}$") according to a reception error rate (e.g., BLER) in a downlink data channel (PDSCH) calculated based on an ACK/NACK signal for the downlink data channel (e.g., PDSCH) notified by using an uplink channel (e.g., PUCCCH or PDSCH).

In the first aspect of the embodiment, it may be possible to include: a CQI acquisition unit 21 configured to acquire channel quality information (e.g., CQI) in a downlink data channel (e.g., PDSCH) through which the streams are transmitted, from a mobile station UE; an adjustment unit 12 configured to adjust the channel quality information according to a reception error rate; and a TBS and modulation scheme determination unit 23 configured to determine a modulation scheme used and the number of bits (e.g., TBS) that can be transmitted by a predetermined radio resource (e.g., one resource block) used through a downlink data channel, based on the channel quality information adjusted by the adjustment unit 12.

The operation of the above-described mobile station UE or radio base station eNB may be implemented by a hardware, may also be implemented by a software module executed by a processor, and may further be implemented by the combination of the both.

The software module may be arranged in a storing medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

Such a storing medium is connected to the processor so that the processor can write and read information into and from the storing medium. Such a storing medium may also be accumulated in the processor. Such a storing medium and processor may be arranged in ASIC. Such ASIC may be arranged in the mobile station UE or the radio base station eNB. As a discrete component, such a storing medium and processor may be arranged in the mobile station UE or the radio base station eNB.

Thus, the present invention has been explained in detail by using the above-described embodiments; however, it is obvious that for persons skilled in the art, the present invention is not limited to the embodiments explained herein. The present invention can be implemented as a corrected, modified mode without departing from the gist and the scope of the present invention defined by the claims. Therefore, the description of the specification is intended for explaining the example only and does not impose any limited meaning to the present invention.

The invention claimed is:

1. A radio base station configured to perform a MIMO multiplexing transmission in which multiple different streams are simultaneously transmitted in a downlink data channel to a mobile station by using multiple antennas, the radio base station comprising:
   a rank indicator acquisition unit configured to acquire, from the mobile station, a rank indicator indicating number of streams determined by the mobile station;
   a rank indicator adjustment unit configured to adjust the rank indicator acquired by the rank indicator acquisition unit, by using an offset value unique to the mobile station,
   wherein the rank indicator adjustment unit is configured to adjust the rank indicator, according to a reception error rate in the downlink data channel calculated based on an ACK/NACK signal for the downlink data channel notified by using an uplink channel;
   a stream-number determination unit configured to determine the number of streams to be simultaneously transmitted to the mobile station, based on the rank indicator adjusted by the rank indicator adjustment unit;
   a channel quality information acquisition unit configured to acquire, from the mobile station, channel quality information in the downlink data channel through which the streams are transmitted;
   a channel quality information adjustment unit configured to adjust the channel quality information according to the reception error rate; and
   a determination unit configured to determine a modulation scheme used and the number of bits that can be transmitted by a predetermined radio resource used in the downlink data channel, based on the channel quality information adjusted by the channel quality information adjustment unit.

2. The radio base station according to claim 1, wherein the rank indicator adjustment unit is configured to adjust the offset value unique to the mobile station, according to a reception result of the streams in the mobile station.

* * * * *